United States Patent [19]
Tognazzini

[11] Patent Number: 5,790,974
[45] Date of Patent: Aug. 4, 1998

[54] PORTABLE CALENDARING DEVICE HAVING PERCEPTUAL AGENT MANAGING CALENDAR ENTRIES

[75] Inventor: Bruce Tognazzini, Woodside, Calif.

[73] Assignee: Sun Microsystems, Inc., Palo Alto, Calif.

[21] Appl. No.: 639,816

[22] Filed: Apr. 29, 1996

[51] Int. Cl.$^6$ ..................................... D21G 1/00
[52] U.S. Cl. ..................... 701/204; 70/201; 70/207; 395/200.32; 395/200.47; 340/988; 340/989; 340/990
[58] Field of Search ..................... 701/201, 202, 701/204, 207, 209, 213, 220, 300; 395/200.32, 200.47, 200.57, 200.61; 340/988, 989, 990, 991, 992, 994, 995

[56] References Cited

U.S. PATENT DOCUMENTS 5,311,173  5/1994  Komura et al. ..................... 340/995
5,570,100  10/1996  Grube et al. ..................... 342/457

*Primary Examiner*—Thomas Peeso
*Attorney, Agent, or Firm*—McDermott, Will & Emery

[57] ABSTRACT

A personal calendaring system includes a portable calendaring system and a complementary office calendar system, each synchronizing calendar entries by two-way wireless transmission. The portable calendaring system includes a GPS receiver interface providing location data. The office calendar system and the portable calendar system each includes a calendar memory storing calendar entries, a wireless paging interface for exchanging schedule change requests and location data, a traffic receiver interface receiving wireless traffic data from an external source, and a perceptual software agent that automatically updates stored calendar entries in response to detected events. The perceptual agents of the respective portable and office systems communicate using the two-way wireless paging interfaces to ensure the stored schedules are synchronized, and to minimize conflicts between schedule change requests entered at respective locations. If a conflict is generated between the stored schedule and a schedule request, the agents arbitrate resolution of the generated conflict. The perceptual agents also update scheduled travel times and associated reminder alarms in response to detected changes in traffic or the location of the portable calendaring system, and advise the user if a schedule conflict arises due to the updated travel time.

31 Claims, 8 Drawing Sheets

| DATE 7/7/96 | | | |
|---|---|---|---|
| TIME | LOCATION | MEMO | MAP |
| 7AM | | | |
| 8 | SAN JOSE SALES OFC. | BREAKFAST STRATEGY MEETING | 157 |
| 9 | | | |
| 9:15 | TRAVEL | TRAFFIC ALERT | 157:24: 38:51 |
| 10AM | STANFORD UNIV. | LECTURE | 51 |
| 11AM | TRAVEL | | 51:21:24 |
| 11:15 | PALO ALTO | MEET CLIENT | 24 |
| 12 | | | |
| 1PM | | | |
| 1:15 | TRAVEL | | 24:65:280: 103:158:77 |
| 2PM | SAN FRANSISCO | MEET NEW CONTACT | |

Figure 5

PORTABLE CALENDARING DEVICE HAVING PERCEPTUAL AGENT MANAGING CALENDAR ENTRIES

TECHNICAL FIELD

The present invention relates to portable calendar devices, specifically portable calendar devices having software agents controlling calendar operations.

BACKGROUND ART

Computer-based calendar systems typically require calendar entries such as appointment date, time, and description to be manually input by a user. Any automatic function is limited to the calendar entry being a repeated event, for example daily, weekly, etc. Such calendar systems may also store manually input reminder messages where users set activation of an alarm displaying the reminder message of an upcoming appointment at a user-selected time. Such calendars can only be updated by manual entry, and serve no useful purpose other than to enabling a user to recall previously-entered calendar events.

Calendar systems have also been implemented in laptop computers and personal digital assistants (PDA), enabling users to maintain their calendar schedules while away from the office, for example on business trips, sales calls, etc. However, changes in the user's schedule still requires the user to manually update the portable calendar. For example, a user of a portable calendar system may have a secretary at the user's office that is notified that a previously scheduled meeting has been canceled. The secretary may then schedule a second meeting at the time of the canceled meeting but at a different location. The secretary would then need to notify the user of the changed schedule, typically by a wireless pager or a cellular telephone. However, a user may decide to ignore the pager or telephone call at the moment due to other pressing duties, requiring the user to call back the secretary at a later time. Assuming the secretary is able to contact the user, the user must then spend time to manually revise the portable calendar system. A user may need to make several telephone calls during a day to determine the status of upcoming appointments. Meanwhile, reminder alarms for canceled meetings may still be active, causing an unnecessary disruption for the user.

Hence, current calendaring systems serve only to recall previously-recorded scheduling information, and have no capability to inform a user of changing conditions effecting the appointments identified by the calendar entries.

DISCLOSURE OF THE INVENTION

There is a need for a portable calendar system that automatically responds to varying conditions affecting a user's schedule.

There is also a need for a portable calendar system having a perceptual agent that automatically updates a portable calendar system in response to remote calendar entries generated from a remote calendar system.

There is also a need for a portable calendar system that calculates travel times in response to received traffic data and alerts the user of the portable calendar system if the calculated travel time conflicts with a start time of a scheduled appointment.

There is also a need for an integrated personal calendar system that communicates with an office calendar system to ensure consistency between the portable calendar and the office calendar in response to respective changes in the calendar systems.

There is also a need for a portable calendar system that generates an alternate travel route if a selected travel route is determined to have a travel time conflicting with a scheduled appointment.

These and other advantages are obtained by the present invention, where a portable calendar system includes a perceptual agent that receives information from different sources to manage the portable calendar system in view of detected changes.

According to one aspect of the present invention, a portable calendar system includes a wireless transceiver interface receiving a first calendar entry from a transmitting calendar system complementary to the portable calendar system, the first calendar entry identifying a first location, a first wireless receiver interface receiving location data and determining a current location of the portable calendar system, a mapping database storing geographic coordinate data and travel time information between identified locations, and an agent generating a second calendar entry input by a user and identifying a second location, the agent identifying one of the first and second calendar entries as a next appointment entry and calculating an estimated travel time for the next appointment entry in response to the determined current location, the location of the next appointment entry, and the corresponding stored travel time information.

The portable calendar system maintains calendar entries in accordance with the calendar entries in the transmitting calendar system. Hence, the portable calendar system is updated with any changes generated in the transmitting calendar system, and determines the estimated travel time for the next appointment entry in the updated portable calendar system. Changes in the portable calendar system are also transmitted via the first transceiver interface for updating the transmitting calendar system, ensuring consistency between the transmitting calendar system and the portable calendar system.

In another aspect of the present invention, a method of managing a personal calendar in a portable device includes receiving from a remote calendar system a first calendar entry having a first time entry and identifying a first location, determining a current location from wireless location data received from a wireless location detection system, receiving wireless traffic data, and calculating an estimated travel time, based on the received wireless traffic data, between one of (1) the determined current location and the first location, and (2) the first location and a second location of a second calendar entry stored in the personal calendar and having a second time entry. The calculation of an estimated travel time based on the received wireless traffic data ensures accurate management of calendar entries and travel time despite constantly changing conditions such as traffic congestion or a sudden shutdown of a travel route due to accidents, construction, etc. The calculation of an estimated travel time for calendar entries from the remote calendar system also enables the personal calendar to be updated from the remote calendar system without introducing any conflicts into the user's schedule. Hence, the user's schedule can be maximized using resources at the remote calendar system in combination with received wireless traffic data to determine the optimal schedule for the user. A more specific aspect of the invention includes storing a digitized map, identifying a first travel route corresponding to the estimated travel time, and identifying a second travel route having an alternate estimated travel time if the first travel route has an estimated travel time that conflicts with a user's schedule. Hence, a user can identify alternate travel routes if the wireless traffic data determines that a selected travel route becomes unacceptable.

Still another aspect of the present invention provides a personal calendar system comprising an office calendar system having a first interface receiving primary user calendar information from a transceiver, a second interface receiving secondary user calendar information, and a first agent generating the office calendar in response to the primary user calendar information and the secondary user calendar information and outputting office calendar information representing selected portions of the office calendar to the first interface, the personal calendar system also including a portable calendar system having a first wireless transceiver interface receiving the office calendar information, a second wireless receiver interface receiving location data, and a second agent generating a personal calendar in the portable calendar system in response to the received office calendar information and the location data, the second agent outputting the secondary user calendar information including changes in the personal calendar relative to the received office calendar information.

The personal calendar system ensures that the office calendar system and the portable calendar system remain synchronized by exchanging updated information related to the personal calendar. Hence, the personal calendar system enables updating by either a user of the office calendar system or a user of the portable calendar system. The secondary user calendar information output from the second agent of the portable calendar system may also include arbitration information between conflicting entries in the office calendar system and the portable calendar system, ensuring avoidance of conflicts between the office calendar system and the portable calendar system.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIG. 5 is an illustration of the calendar information stored in the office calendar system and the portable calendar system of FIG. 1.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

BEST MODE FOR CARRYING OUT THE INVENTION

Figure 1:
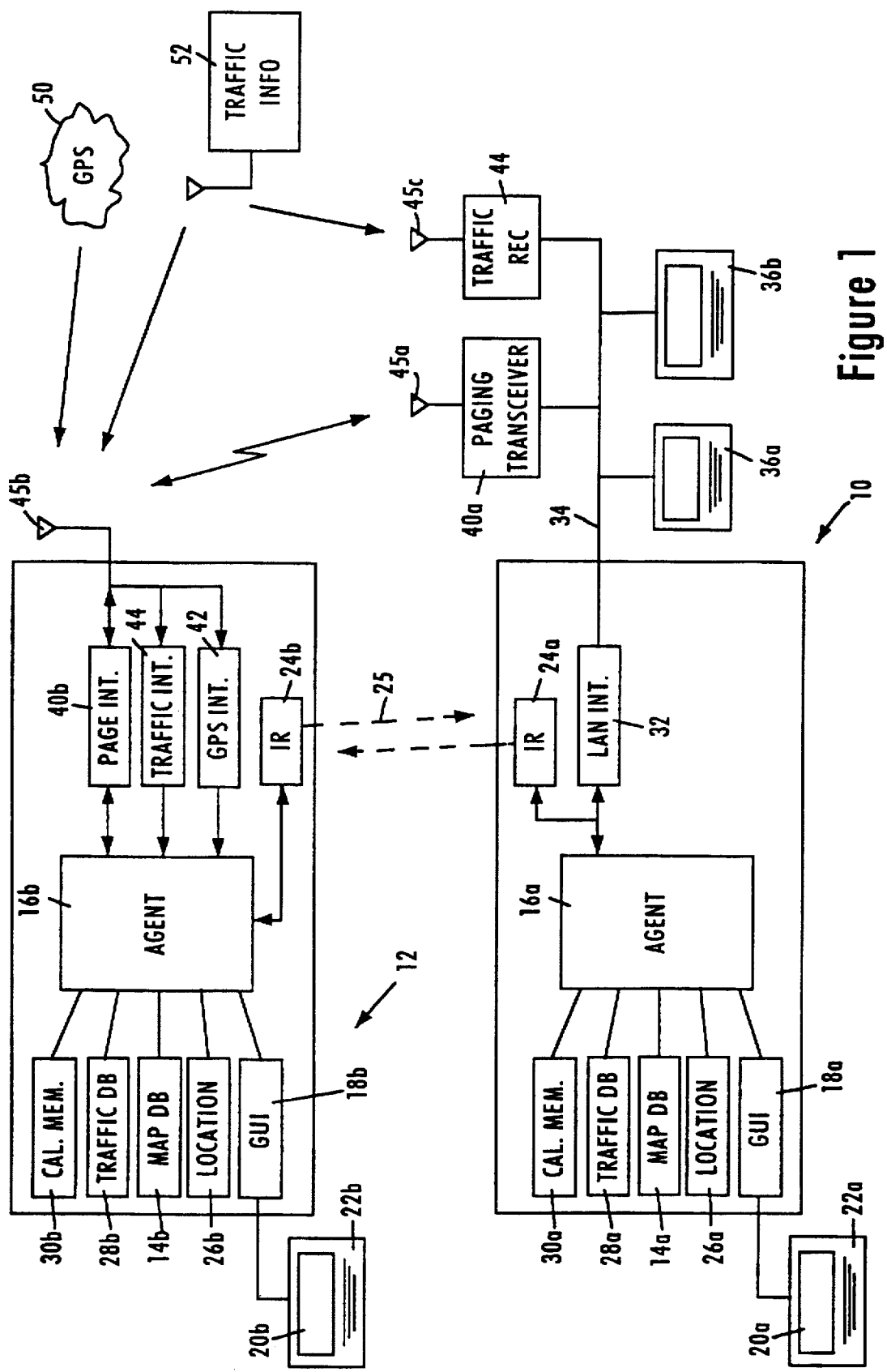
FIG. 1 is a block diagram of the personal calendar system according to an embodiment of the present invention.

FIG. 1 is a block diagram of a personal calendar system according to an embodiment of the present invention. The personal calendar system of FIG. 1 includes an office calendar system 10 and a portable calendar system 12. The office calendar system 10 and the portable calendar system 12 include complementary components to perform calendaring functions in parallel. For example, the office calendar system 10 and the portable calendar system each includes a calendar memory 30, implemented as a random access memory, that stores calendar entries of the personal calendar including date, time, location, memo data, and travel route information. An exemplary data structure of the office calendar memory 30 is shown in FIG. 5. The systems 10 and 12 each also includes a digital map database 14 that stores geographic coordinate data of locations in a predetermined area and travel time information between identified locations, such that a path between points A and B will have a predetermined travel time.

The office calendar system 10 and the portable calendar system 12 each also includes a software agent 16 that controls the personal calendar system and generates calendar entries based upon user inputs and received transmissions from the complementary calendar system. A graphic user interface (GUI) 18 drives a display 20 and accepts user inputs from a keyboard 22, and a wireless interface 24, for example an infrared transceiver, sends and receives wireless transmissions to the complementary calendar system by short range infrared transmission 25. A location register 26 is used to store location information representing the current location of the portable calendar system.

The office calendar system 10 shown in FIG. 1 may be implemented as a personal computer having a local area network interface 32 for communicating with network stations having authorized access to the personal calendar system, and sending and receiving transmissions via commercial wireless networks, described below. The calendar memory 30a, the traffic database 28a, the map database 14a, and the location register 26a are preferably implemented as a nonvolatile memory or a reserved portion of a hard disk to ensure no memory loss due to power failure. The portable calendar system 12 may be implemented as a laptop computer or a personal digital assistant (PDA) to provide a more compact arrangement. Although not shown, the portable calendar system 12 may also include a PCMCIA slot to accept a PCMCIA card for programming, configuration, or to download database information for the digital map database 14b or the traffic database 28b.

The calendar systems 10 and 12 operate under the control of the respective agents 16a and 16b. The agents 16a and 16b are perceptual agents that control the storage of calendar entries in the respective calendar memories 30a and 30b by perceiving data from several sources to provide an up to date calendar having changes automatically entered in response to detected changes. For example, the agent 16b relies on a link to the office calendar system 10 by 2-way wireless transmission, for example via the IR interface 24b during short-range transmission, to ensure that the portable calendar 30b and the office calendar 30a remain synchronized. If the user is at a distant location and wishes to enter an appointment, the calendar entry input by the user using the keyboard 22b is transmitted by the agent 16b to the office calendar agent 16a to ensure the office calendar 30a is updated with the new entry. Similarly, if office personnel, such as a secretary or co-worker wishes to enter, alter, or request an appointment given proper authorization, the agent 16a transmits the change request to the portable calendar system 12 by wireless transmission.

Although the IR interface 24a and 24b are convenient for short-range transmission, the portable calendar system 12 includes a paging transceivers 40b for long-range communication using known wireless techniques, for example, RF analog radio transmission, or by subscribing to existing 2-way paging, cellular, or satellite systems. The IR interface 24 may also be substituted with an RJ-45 connector for communication between the office calendar system 10 and the portable calendar system 12 by telephone lines.

The perceptual agents 16a and 16b also update the personal calendar information stored in the calendar memory 30a and 30b respectively by receiving location information and traffic information from external sources, for example a wireless location detection system 50 and a traffic monitoring and reporting system 52. According to the disclosed embodiment, the personal calendar system 12 includes a GPS receiver interface 42 for receiving location data from the global positioning system (GPS) network 50, well known in the art.

The GPS receiver interface 42 is implemented as a miniaturized GPS receiver that measures the time a radio signal takes to travel from a GPS satellite in the GPS network 50 until it arrives at the antenna 45b. The GPS receiver 42 will listen to signals from either 3 or 4 satellites at a time and triangulate a position fix using the interval between the transmission and reception of the satellite signal from the GPS satellite system 50. The GPS receiver interface 42 may track up to 8 satellites at a time, such that if one satellite becomes unavailable, the GPS receiver interface 42 knows where to find a best possible replacement. As known in the art, three satellites are used for two dimensional positioning, although 4 satellites may be used for three dimensional positioning, i.e., position and elevation.

The GPS receiver interface 42 thus determines a current location of the portable calendar system 12 within an accuracy of +/−100 meters and supplies the current location information to the agent 16b for storage in the location register 26b. If desired, accuracy may be reduced to an error of less than 24 meters by eliminating errors introduced by selective availability, currently implemented by the U.S. Air Force, or by performing differential GPS by placing a second GPS receiver at a fixed point, for example at the office calendar system 10. Error reduction techniques using differential GPS are well known in the art.

As shown in FIG. 1, the office calendar 10 has a network interface 32, for example an Ethernet/IEEE 802.3 interface connecting the computer implementing the office calendar system to a local area network 34. The local area network connects the office calendar computer to the additional work stations 36a and 36b and a two-way paging transceiver 40a that communicates with the paging transceiver 40b in the portable calendar device 12. Thus, the paging transceiver 40a sends out office calendar information representing selected portions of office calendar from respective stations of the local area network to the corresponding portable calendar system 12. As recognized in the art, the paging transceiver 40a may send and receive the calendar information for different office/portable calendar pairs on different RF channel, or may send and receive paging messages as part of a commercial paging network. If the messages are sent from the office calendar system using a commercial paging network, the paging transceiver 40a may not be located at the office premises of the office calendar system, but rather may be implemented as a transmitting station of the commercial network. Hence, the actual transceiver interface for the agent 16a is the LAN interface 32, since the paging transceiver 40a may be at a local or a remote location. The paging transceiver 40b in the portable, however, also is the paging transceiver interface for the agent 16b.

Messages are sent and received between the paging transceiver 40a and the transceiver interface 40b at an interval of approximately 1 message per minute. Hence, the calendar systems are updated without excessive wireless traffic.

As described below, the agent 16b stores the current location in a location register 26b and determines whether any change in the current location of the portable calendar system 12 causes a conflict with the calendar entries stored in the calendar memory 30b. Specifically, the agent 16b identifies a next appointment entry based on the system time clock, and calculates an estimated travel time based on the current location stored in the register 26b and the location identified by the next appointment entry. The agent 16b then selects a travel time between two locations stored in the digital map database 14b that most closely correspond to the current location of the portable calendar system and the location of the next appointment entry. If necessary, the agent 16b may perform interpolation to approximate the estimated travel time if the identified locations in the digital map database 14b corresponding to the stored travel time information substantially varies from the locations under consideration. The agent 16b may also access the traffic information database 28b to provide a more accurate estimate of the travel time, described below.

After the agent 16b has calculated the estimated travel time for the next appointment entry, the agent 16b compares the difference between the system clock time and the scheduled time of the next appointment entry with the estimated travel time. If the estimated travel time indicates that the user will be late for the next scheduled appointment, the agent 16b outputs an alert to the graphic user interface 18b to notify the user of the conflict.

The agent 16b also can calculate an estimated travel time between a stored calendar entry and a new calendar entry to determine if the new calendar entry creates a conflict in the personal calendar. In such a case, the agent 16b compares the locations identified by the respective calendar entries with travel time information from the digital map database 14b to determine if sufficient has been allocated for travel. The traffic information database 28b may also be accessed. If the agent 16b determines that insufficient time has been allocated for travel, the agent 16b notifies the user of the conflict. Hence, the calculation of estimated travel time is particularly effective not only for a user determining the travel time for an upcoming schedule, but also is effective in estimating the amount of travel time that needs to be scheduled for future dates. Moreover, the calculation of estimated travel time in combination with synchronizing the office calendar system 10 and the portable calendar system 12 minimizes any conflicts in the personal calendar, for example by a secretary or office worker attempting to enter a conflicting calendar entry into the office calendar 10.

The stations 36a and 36b connected to the local area network 36a have selective access to the office calendar system 10. For example, the station 36a may be granted an editing authorization to add, modify, or delete calendar entries in the main calendar 30a. Such authorization may be granted, for example, to a secretary of the user of the portable calendar system 12. A lower authorization level, for example, a read-only capability, may be granted to the station 36b, used for example by colleagues that wish to determine the availability of the user of the portable calendar system 12 for future meetings.

The station 36a also is able to determine the current location of the portable calendar device by accessing the location data stored in the location register 26a. As described below, the agent 16b periodically transmits the location information from the location register 26b to the office calendar system 10 via the wireless transceiver 40b. Hence, the secretary using the station 36a is able to effectively manage the office calendar schedule in the main calendar 30a in order to respond to inquiries about the whereabouts of the user of the portable calendar system 12. If desired, the transmission of the location data in 26b may be disabled at the user's discretion for privacy reasons.

The portable calendar system of the present invention also calculates estimated travel times in response to received traffic information from a traffic information service 52. The traffic information service 52 may be a government agency, such as a police station or highway patrol, that periodically broadcasts traffic information such as roads under construction, detected accidents, etc. in a predetermined digital format that identifies a road or road portion, and the condition of that road portion. Alternately, the traffic information provider 52 may be a specialized service available by subscription, whereby personalized traffic information is selectively transmitted to authorized users for selected travel routes.

Thus, the portable calendar system 12 and the office calendar system can obtain up to date and accurate estimated travel times. As described below, the agents 16a and 16b may also determine alternate travel routes if received traffic information indicates that the recalculated travel time will conflict with an appointment schedule. Thus, the traffic information may supplement the travel time information stored in the digital map database 14b. If desired, the received traffic information from the traffic information provider 52 may also be stored in the traffic information databases 28 to maintain an historical record of travel routes having high occurrences of accidents, construction, etc. The accumulated traffic information may thus be used by the agent 16 to provide a more accurate and up to date estimate of travel time.

The traffic information broadcast by the traffic information provider 52 is detected and processed by a traffic receiver interface 44 that decodes and processes the received broadcast signal into traffic information for use by the respective agent.

Figure 2:
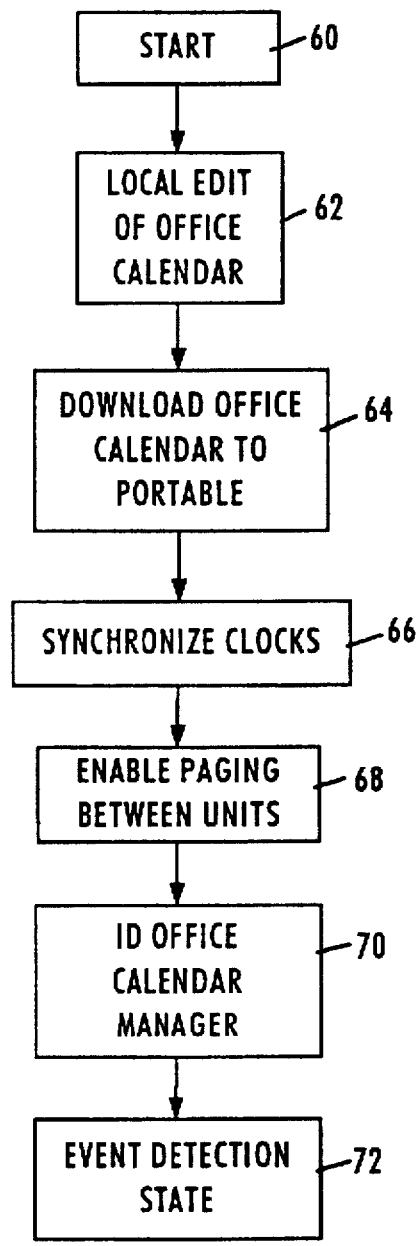
FIG. 2 is a flow diagram of initializing the personal calendar system of FIG. 1.

FIG. 2 is a flow diagram illustrating an initialization of the office calendar 10 and the portable calendar system 12 according to the disclosed embodiment. The process starts in step 60 by performing all necessary hardware and software initialization, after which the office calendar 10 may be edited locally in step 62 by the user typing in inputs by the keyboard 22a, or by receiving inputs from a secretary at station 36a. The agent 16a responds to the user and/or secretary inputs and stores the calendar entry in the calendar memory 30a.

After a sufficient number of entries have been entered into the calendar memory 30a, the office calendar is downloaded in step 64 into the portable calendar system 12. As recognized in the art, the downloading may be performed either using the infrared (IR) transceivers 24 or a hardwire connection. The agent 16b receives the downloaded office calendar information and stores the received office calendar information in the calendar memory 30b. The internal processor clocks of the agents 16a and 16b are then synchronized in step 66, and the wireless paging operations of both the paging transceivers 40a and 40b are enabled in step 68 by activating the appropriate protocol, including mode of transmission, user ID, etc. to enable communication between the portable calendar system 12 and the office calendar system 10.

The local area network interface 32 in the office calendar 10 is then set in step 70 to identify the office calendar manager having priority to access and modify the calendar memory 30a, for example the secretary at 36a of the user of the portable calendar system 12. Thus, the secretary at station 36a is able to manage the office calendar 10 while the user of the portable calendar system 12 is at remote locations. The personal calendar system then enters a wait state in step 72, waiting for user inputs or reception of paging transmission from the complimentary calendar system.

Figure 3A:
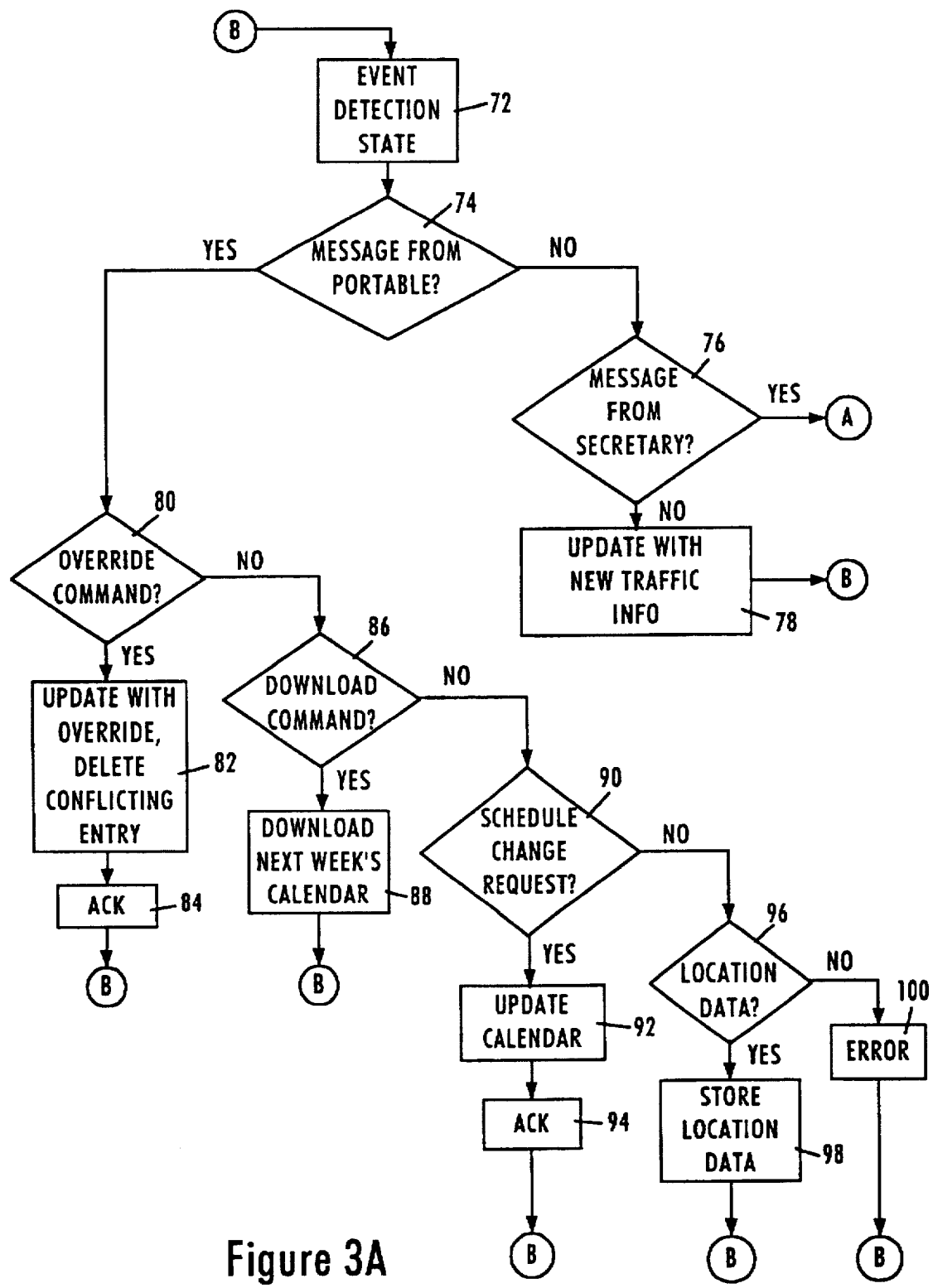
FIGS. 3A and 3B summarize the operations of the office calendar system of FIG. 1.
Figure 3B:
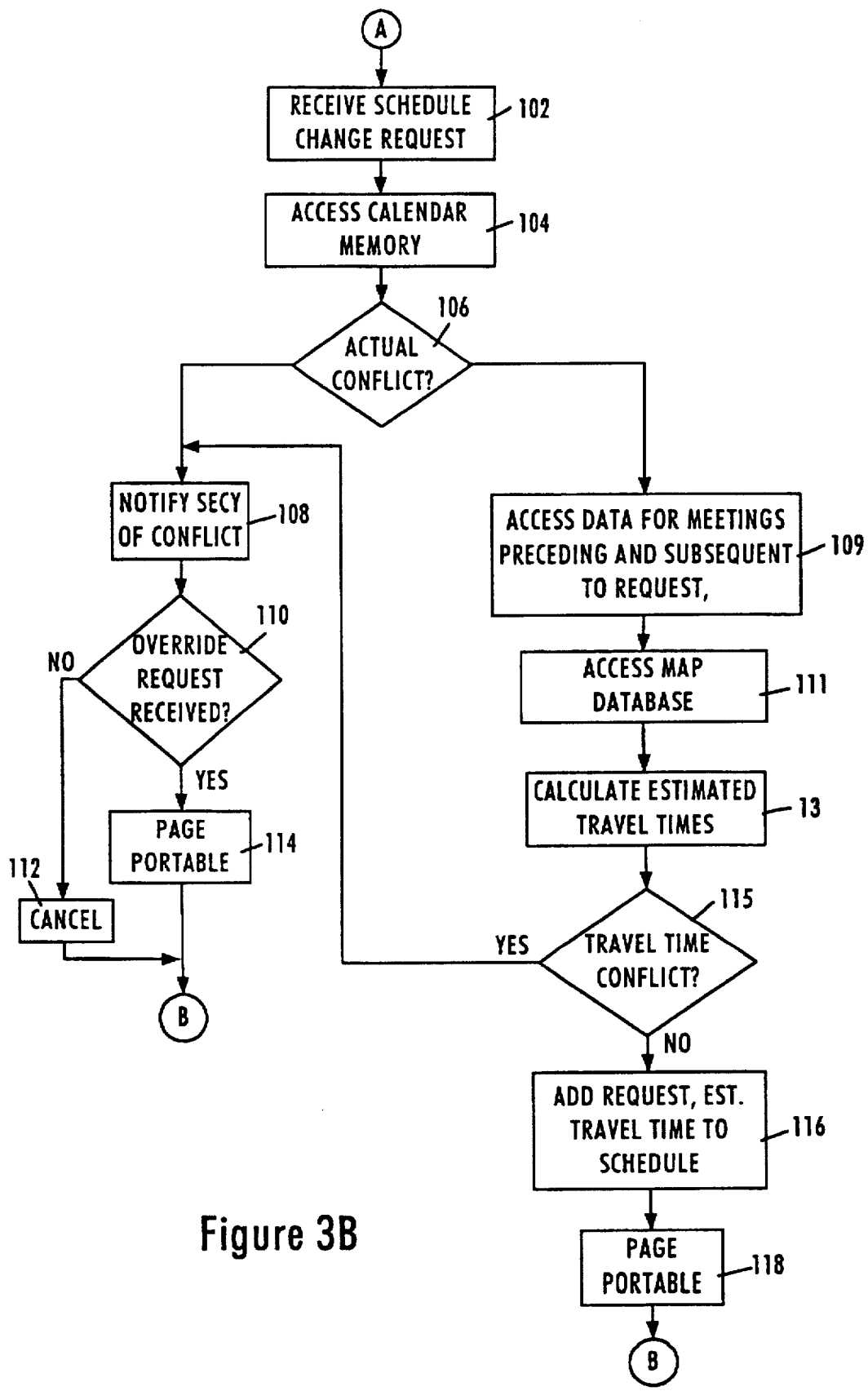

FIGS. 3A and 3B summarize the operations of the agent 16a in the office calendar 10 during normal operations. The agent 16a begins in the same wait state in step 72 as shown in FIG. 2. Upon detecting an event from one of the interfaces, the agent 16a determines in step 74 whether the event is a message received from the portable via the wireless transceiver interface. If the event is not a message received from the portable calendar system 12, the agent 16a determines in step 76 whether the event is a schedule change request from the station 36a or traffic information received from the traffic receiver 44. If the event is received traffic information, the traffic information database 28a is updated with the received traffic information, and the estimated travel times stored in the calendar memory 30a are updated if the received traffic information is relevant to the locations stored in the calendar entries in step 78. If the detected event is a schedule change request, for example from a secretary, the agent 16a proceeds to perform the steps in FIG. 3B, described below.

If the detected event in step 74 is a message received from the portable, the agent 16a determines in step 80 whether the received message from the portable calendar system 12 is a user message containing an override command. As described below, an override command from the portable calendar system 12 includes arbitration information identifying a priority calendar entry between conflicting entries in the office calendar system and the portable calendar system. Thus, if the received message is an override command, the agent 16a updates the calendar 30a in step 82 with the overriding request and deletes the conflicting entry. The agent 16a sends an acknowledgement to the portable calendar system 12 in step 84 and returns to the wait state 72.

If in step 80 the agent 16a determines the received message from the portable 12 is not an override command, the agent 16a then checks whether the received message is a download command in step 86. If the received message is a download command, a selected number of calendar entries stored in the calendar memory 30a will be downloaded by the agent 16a to the portable calendar system 12 via the wireless transceiver 40a in step 88. The downloading in step 88 is preferably of a limited calendar portion, for example a single day or a single week in order to minimize wireless traffic, whereas the downloading in step 64 may be a more extensive downloading of all information upon initialization.

If the message received from the portable is not a download command, the agent 16a checks in step 90 whether the received message is a schedule change request for a new calendar entry. If the received message is a schedule change request, the agent 16a updates the main calendar 30a in step 92 to include the new calendar entry input by the user. User-input entries from the portable 12 take priority over calendar entries stored in the calendar memory 30a since the calendar memory 30a is synchronized with the calendar entries stored in the calendar memory 30b. Specifically, the two-way communication between the agents 16a and 16b via the respective paging transceivers 40a and 40b synchronizes the calendar entries stored in the calendar memory 30a with the calendar entries stored in the calendar memory 30b, enabling a user entering a schedule change in the portable calendar system 12 to be aware of any prior conflicting entries in the office calendar memory 30a. Hence, no confirmation request is sent to the portable before updating the calendar in step 92. If desired, however, a request for confirmation of the schedule change may be added, if desired.

After the calendar memory 30a has been updated in step 92, the agent 16a sends an acknowledgement in step 94 to the portable calendar system 12 via the paging transceiver 40a. The sending of acknowledgements in response to received messages is optional, depending upon the predetermined protocol between the portable calendar system 12 and the office calendar system 10.

If in step 90 the agent 16a determines the received message is not a schedule change request, the agent 16a checks in step 96 whether the received message is location data identifying the current location of the portable calendar system 12. If the agent 16a determines the received message contains location data, the agent 16a stores the received location data in the register 26a during step 98. If the agent 16a determines that the received message is not location data, then an error message is sent to the portable calendar device 12 in step 100. Depending on the protocol, the agent 16b, upon receiving the error message, may either retransmit the message or alert the user of the transmission error, indicating transmission difficulty due to weather conditions or out of range, or indicating a hardware or software failure of the device.

FIG. 3B is a flow diagram of the steps performed by the agent 16a when the received message from the portable is a schedule change request from the auxiliary network station 36a, for example a secretary managing the office calendar of the user of the portable calendar system 12. The agent 16a receives the schedule change request from the secretary in step 102 and accesses the calendar memory 30a in step 104 to obtain the calendar entry data corresponding to the date of the schedule change request. After accessing the appropriate calendar entry data from the calendar memory 30a, the agent 16a determines in step 106 whether there is an actual conflict between the stored calendar entry data and the schedule change request in step 106. If the agent 16a determines an actual conflict, the auxiliary station 36a is notified of the conflict in step 108, prompting the secretary to input an override request if an override is desired for a priority schedule change request. If in step 110 an override request is not received, then the schedule change request is cancelled in step 112 and the agent 16a returns to a wait state. However, if an override request is received by the agent 16a, the agent 16a pages the portable calendar system 12 via the paging transceiver 40a by sending a message prompting the user whether to accept the override request in step 114. The message sent to the portable calendar system 12 will include the data corresponding to the schedule change request, including date, time, location, and memorandum information including a subject of the meeting, and a flag indicator indicating to the agent 16b that the message is an override request. After sending the override request to the portable 12, the agent 16a returns to the wait state.

If in step 106 the agent 16a determines that there is no actual conflict, the agent 16a accesses the calendar memory 30 in step 109 for the calendar entries preceding and subsequent to the schedule change request. The agent 16a also accesses in step 111 the map database 14a and optionally the traffic information database 28a to compare the time and location of the schedule change request with the time and location corresponding to preceding and subsequent meetings. The estimated travel times between the appointment identified in the schedule change request and the preceding and subsequent messages are then calculated in step 113 and compared with the appointment times of the preceding meeting, the requested meeting, and the subsequent meeting to determine in step 115 if there is a travel time conflict based on the estimated travel times. If the agent 16a determines there is no travel time conflict, the agent 16a adds the schedule change request to the office calendar memory 30a in step 116, and transmits the schedule change request to the portable 12 in step 118 using the paging transceiver 40a to update the schedule stored in the portable calendar system 12.

Figure 4A:
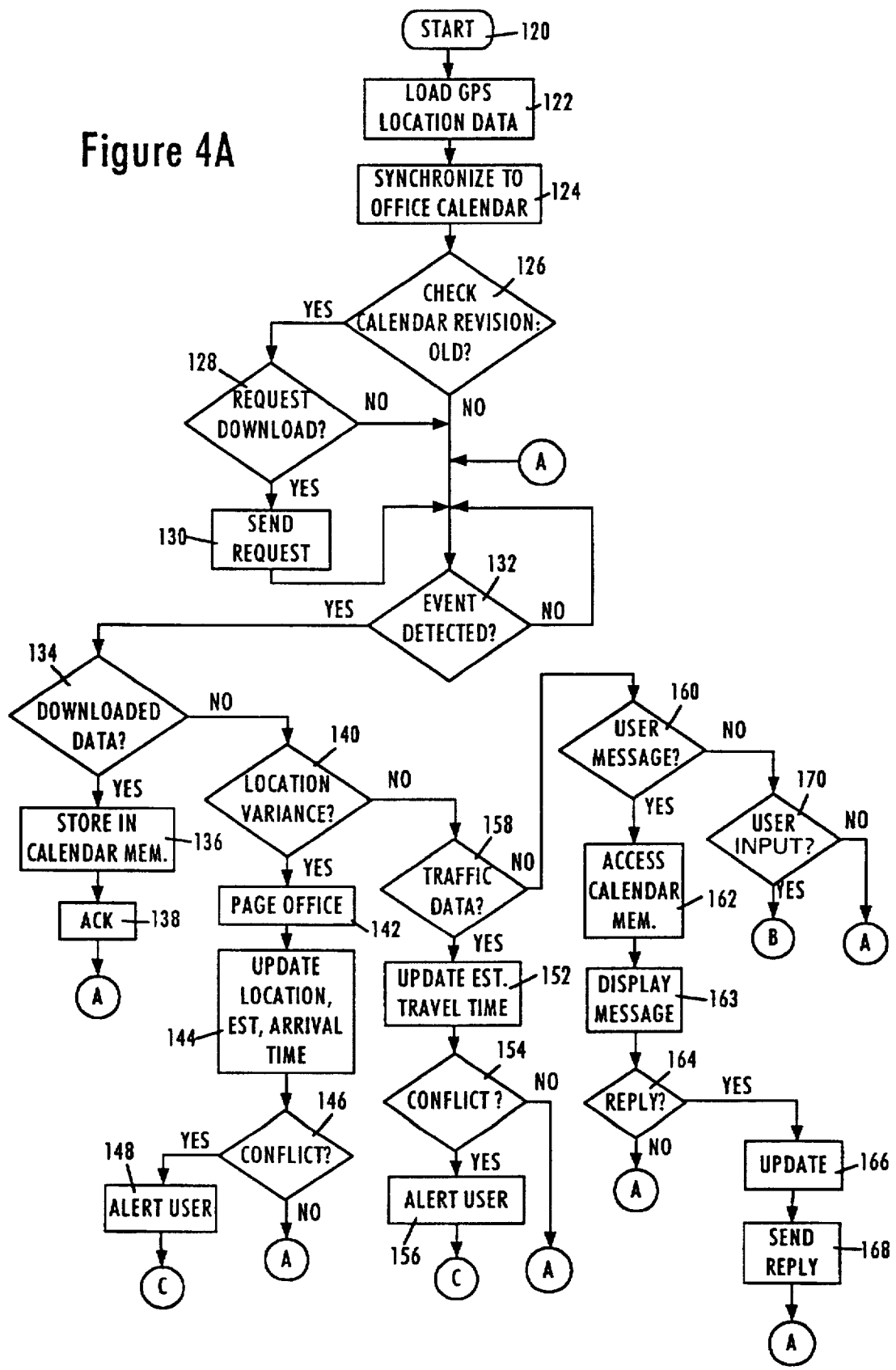
FIGS. 4A, 4B and 4C are flow diagrams summarizing the operation of the portable calendar system of FIG. 1.

FIG. 4A is a flow diagram illustrating the operations of the agent 16b in the portable calendar system 12 according to the embodiment of the present invention. The portable calendar system is activated from a standby state in step 120. The agent 16b receives the current location of the portable calendar system from the GPS transceiver interface 42, and stores the current location in the location register 26b in step 122. As recognized in the art, the GPS receiver 42 receives the location coordinate data from the GPS system 50 and calculates a current location of the portable calendar system according to known techniques.

The agent 16b synchronizes to the agent 16a of the office calendar system 10 in step 124 by sending a request for synchronizing data including current date, current time, and a revision ID of the office calendar memory 30a, for example, an identifier including the date and time the last modification was made to the office calendar memory 30a. After receiving the synchronizing information from the office calendar in step 124, the agent 16b checks in step 126 whether the portable calendar memory 30b corresponds to the office calendar memory 30a, i.e., whether the portable calendar memory 30b includes all the revisions of the office calendar memory 30a. If the agent 16b determines that the portable calendar memory 30b does not contain the latest revisions, the agent 16b prompts the user in step 128 whether to request a download from the office calendar system 10. If the user requests a download, the agent 16b sends the download request in step 130 to the office calendar system 10 via the paging transceiver 40b.

The agent 16b then enters an event detection state in step 132, where the agent 16b monitors the associated interfaces to detect reception of a signal. Upon detecting an event, for example a user input or a received transmission, the agent 16b checks in step 134 whether the event represents downloaded calendar data from the office calendar system 10 in step 134. If the detected event corresponds to downloaded calendar data, the received data is stored by the agent 16b in the portable calendar memory 30b in step 136, and an acknowledgement is sent by the agent 16b to the office calendar 10 in step 138.

If in step 134 the agent 16b determines the detected event is not downloaded calendar data, the agent 16b checks in step 140 if the detected event is GPS data received from the GPS receiver 42 that has a substantial variance from the location stored in the register 26b. According to the preferred embodiment, the GPS receiver interface 42 after initialization minimizes the overhead of the agent 16b by transmitting GPS data to the agent 16b only when there is a substantial variation (e.g., 250 meters) between the current location of the portable calendar system 12 and the location stored in the register 26b. If more accurate location data is desired, however, the GPS receiver interface 42 may transmit all calculated GPS data to the agent 16b.

If the agent 16b determines the detected event is a new current location, the agent 16b pages the office calendar system 10 with the new location in step 142, and updates the location register 26b with the new location in step 144. The agent 16b also updates the estimated arrival time stored in the portable calendar 30b for an upcoming appointment, as necessary. If the agent 16b in step 146 determines the updated estimated arrival time creates a conflict with the next appointment entry, the agent 16b alerts the user in step 148. If no conflict is generated, however, the agent 16b returns to the event detection state in step 132.

If the agent 16b determines the detected event is not a variation in the current location of the portable calendar, the agent 16b then checks in step 150 whether the detected event is traffic data received from the traffic receiver interface 44. If the detected event is received traffic data, the agent 16b updates the stored estimated travel time as necessary in the portable calendar 30b and stores the traffic data in the traffic information database in step 152.

The agent 16b calculates the revised travel time for the next appointment entry in step 152 based upon the current location stored in the location register 26b, the received traffic data, and the data in the map database including geographic coordinate data corresponding to the next appointment entry in the portable calendar 30b and stored travel time data. If necessary, the agent 16b also calculates the estimated travel time in accordance with the traffic data collected in the travel information database 28b, for example if the traffic information received identifies only a portion of a travel route corresponding to the estimated travel time. If the agent 16b determines a conflict in step 154 between the updated estimated travel time and the next appointment entry in step 154, the user is alerted of the conflict in step 156, and a conflict resolution algorithm is initiated, shown in FIG. 4C. If there is no determined conflict in step 154, the agent 16b returns to the event detection state in step 132.

If the detected event is not traffic data, the agent 16b determines in step 160 whether the detected event is a user message, for example a reminder message initiated by the portable calendar stored in the portable calendar memory, an override request sent from the office calendar system 10 in step 114 of FIG. 3B, or an e-mail message. If the detected event is a user message, the agent 16b accesses the calendar memory 30b in step 162 to obtain calendar entries relevant to the received message, i.e., accessing stored entries corresponding to an override request, and displays the message and the accessed calendar entries in step 163. The user is then prompted in step 164 whether to input a reply. If the user replies to the message, i.e., granting the override request, the agent 16b updates the calendar memory 30b accordingly in step 166 and sends the reply in step 168 to the office calendar system 10 via the wireless paging transceiver 40b.

Figure 4B:
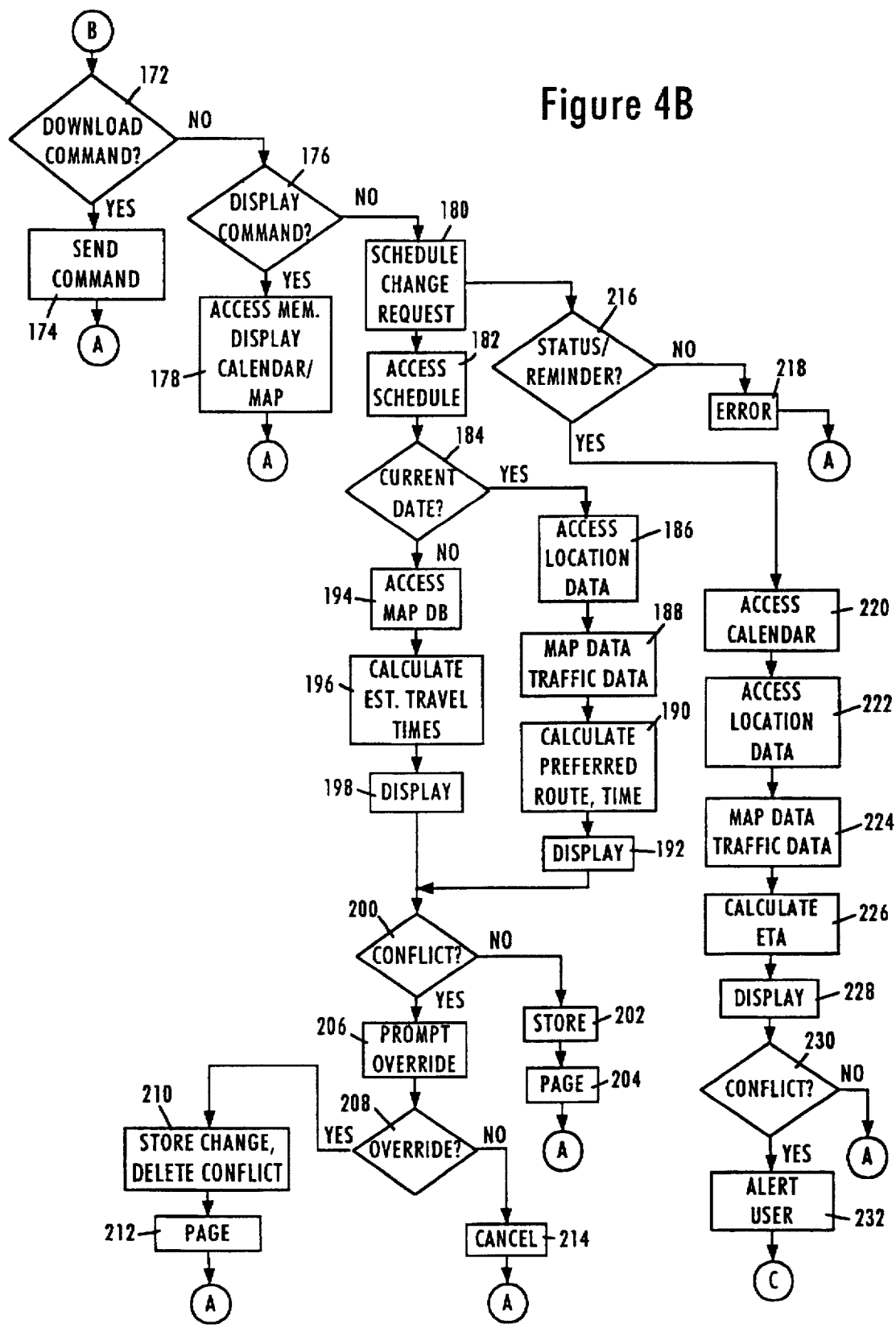

If the agent 16b determines the detected event is not a user message received from the transceiver interface 40b, the agent 16b determines whether the detected event is a key input by the user of the portable calendar system 12 via the user interface 18b in step 170. If the detected event is not a user input, the event is disregarded as an error and the agent 16b returns to the event detection state 132. However, if the detected event is a user input, the agent 16b performs the steps in FIG. 4B to process the user input.

The agent 16b first determines whether the user input is a download command in step 172, and sends the download command to the office calendar system 10 in step 174. Otherwise, the agent 16b checks in step 176 whether the keyed user input is a display command in step 176. If the keyed input is a display command, the agent 16b accesses the portable calendar memory 30b and displays the portable calendar entries for the current date and/or is the digital map by accessing the digital map database 14b in step 178.

If the keyed input is not a display command, the agent 16b checks whether the keyed input is a schedule change request in step 180. If the keyed input is a schedule change request, the agent 16b accesses the relevant calendar entry data preceding and subsequent to the schedule request from the portable calendar memory 30b in step 182. If the agent determines that the schedule change request is for the current date in step 184, the agent 16b accesses the current location stored in register 26b in step 186, and accesses in step 188 the map and traffic data in the databases 14b and 28b, respectively, and calculates a preferred travel route for traveling before and after the appointment corresponding to the schedule change request in step 190. For example, the agent 16b will determine a first travel route based upon the new appointment corresponding to the schedule change request, a preceding appointment location, and the current location of the portable calendar system 12. The agent 16b will calculate at least one travel route from the digital map database 14b having the minimum travel time based on the respective location data and the traffic information. After the preferred route and travel time have been calculated for the new appointment and the subsequent appointment affected by the schedule change request, the preferred routes and estimated travel time are displayed in step 192 by the user interface 18b. As recognized in the art, the calculation and display of a travel route that identifies a current user location may be implemented using commercially available mapping and navigation software.

If in step 184 the schedule request is not for the current data, then the agent 16b merely accesses the digital map database 14b in step 194 to access the appropriate travel information, and calculates in step 196 an estimated travel time for the appointment corresponding to the schedule change request and the subsequent appointment in step 196, and displays the estimated travel times in step 198. Hence, the agent 16b preferably does not calculate the preferred route until the date of the appointment, unless otherwise requested by the user.

After calculating the estimated travel times, the agent 16b determines in step 200 if there is a conflict between the existing calendar entries stored in the portable calendar memory 30b and the appointment corresponding to the schedule change request in step 200. If there is no conflict, the schedule change request and corresponding estimated travel times are stored in step 202 in the portable calendar map 30b, and the schedule change request is transmitted to the office calendar system 10 by use of the paging transceiver 40b in step 204. However, if the keyed schedule change request is determined by the agent 16b to create a conflict, the agent 16b prompts the user in step 206 whether to override the stored calendar entries and store the schedule change request. If the agent 16b detects an override input from the user in step 208, the conflicting calendar entry is deleted and the schedule change request is stored in the portable calendar memory 30b in step 210, and the office calendar system 10 is paged in step 212 with the schedule change request and identification of the deleted calendar entry. If the user inputs a cancel request instead of the override request, the agent 16b cancels the schedule request.

If in step 180 the agent 16b determines the keyed input is not a schedule change request, the agent 16b checks in step 216 whether the keyed input is a status/reminder request. If the agent 16b determines that the keyed input is not a status request, the agent 16b outputs an error message in step 218 and returns to the event detection state in step 132 in FIG. 4A. If the keyed input is a status request, the agent 16b accesses the current schedule in step 220 from the portable calendar memory 30b, the current location from the location register 26b in step 222, and the travel data and traffic data from the digital map database 14b and the traffic information database 28b, respectively, in step 224. The agent 16b then calculates an estimated time of arrival (ETA) at the next scheduled appointment based upon the accessed records in step 226. The agent 16b displays the relevant information from the digital map database 14b including a digitized map, the current location of the portable calendar system, the destination, and the estimated time of arrival in step 228 on the display 20b by outputting the data to the graphic user interface 18b in step 228. If the agent 16b at this time detects a conflict in step 230, for example due to increased traffic or construction information sent from the traffic information provider 52, or due to the current location of the user, the user is alerted in step 232.

Figure 4C:
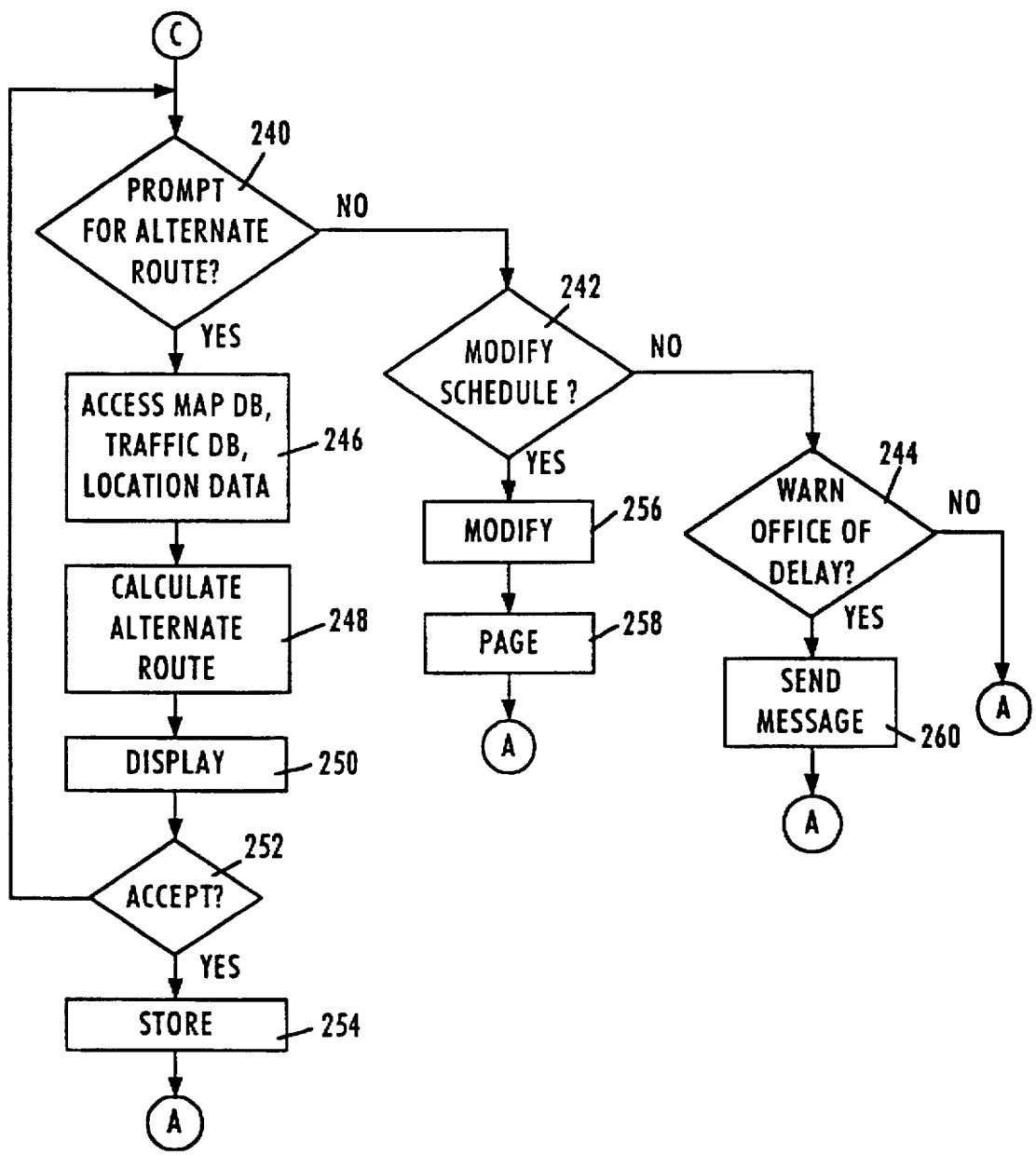

FIG. 4C is a flow diagram showing the conflict resolution procedure executed by the agent 16b. The agent 16b prompts the user in step 240 whether an alternate travel route is desired. If the user does not wish an alternate route, the agent 16b then prompts the user in step 242 whether the personal calendar stored in the calendar memory 30b should be modified. If the user does not want to modify the schedule, the agent 16b then prompts the user in step 244 whether to send a message to the authorized user of the office calendar system 10, for example the secretary at station 36a, warning the secretary of the delay for the upcoming meeting so that appropriate telephone calls, etc. can be made.

If the user selects an alternate route, the agent 16b accesses the map database 14b, the current location in register 26b, and the traffic database 28b in step 246 and calculates the availability of an alternate route in step 248. If the agent 16b is able to calculate an alternate route having an estimated travel time less than the current estimated travel time that generated the conflict, the alternate route is displayed in step 250, along with the corresponding estimated travel time for the alternate route. The user is then prompted in step 252 whether to accept the alternate route. If the user accepts the alternate route, the map data corresponding to the alternate route is stored in the portable calendar memory 30b as part of the travel data in step 254. If desired, the alternate route is also transmitted to the office calendar system 10. If the user in step 252 does not accept the alternate route, the agent 16b returns to prompt the user in step 240.

If the user selects to modify the stored schedule in step 242, the schedule is modified in step 256 by changing the start time of the next appointment to a user-supplied value or at the time calculated as the current clock time plus the estimated time of arrival, and the agent 16b pages the office calendar system 10 with the modified schedule information in step 258. Alternately, if the user selects in step 244 to warn the office of a delay, a message is sent in step 260 in the form of a preformatted e-mail message to the station 36a via the wireless paging system.

FIG. 5 is an illustration of the memory structure of the portable calendar memory 30b and the office calendar memory 30a. The memory structure includes a date field 302, a time field 304, a location field 306, a memo field 308, and a map field 310. The first calendar entry of the selected date has a specified appointment time 304a that specifies the scheduled duration of the appointment. The entry 304b identifies a travel interval calculated by one of the agents 16 and having a travel time of 45 minutes between appointments. The memo field 308b of the travel interval includes traffic information from the traffic receiver interface 44 identifying a heavy traffic alert on the selected route. The selected route is stored in the map field 310b by a sequence of map identifier values corresponding to identified locations of the digital map database. Thus, the sequence (157:24:38:51) corresponds to a travel route having the sequence of travel points location number 157, location number 24, location number 38, and location number 51. Hence, each travel time entry stored in the calendar memory 30 includes the estimated travel time 304b, traffic conditions 308b, and preferred travel route 310b for travel between appointments.

The estimated travel time may be adjusted as necessary as conditions change. For example, the travel interval 304d may be increased from the 45-minute travel time interval of 1:15 to 2:00 PM to the time interval of 12:30 to 2:00 PM upon a reception of traffic information identifying heavy traffic or construction on the travel route. If desired, the user of the portable calendar device 12 will be advised that additional time must be allocated for the increased travel time, and an alarm advising the user to begin departure for the next appointment will be automatically updated to activate at 12:30 PM instead of 1:15 PM. As will be apparent from the foregoing, audible alarms may be generated at the beginning of travel intervals or when the stored schedule must be updated.

The present invention provides perceptual agents that manage information from a plurality of sources to manage and maintain a user's calendar system automatically without repetitive changes manually by the user. Travel alarms are automatically reset whenever the travel time is changed. Moreover, changes in relevant information, for example rescheduling meetings from a remote location, traffic delays, etc. are provided to the user by automatic notification to ensure a user can adapt to the necessary changes in the schedule.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

I claim:

1. A portable calendar system comprising:
   a wireless transceiver interface receiving a first calendar entry from a transmitting calendar system complementary to the portable calendar system, the first calendar entry identifying a first location;
   a first wireless receiver interface receiving location data and determining a current location of the portable calendar system;
   a mapping database storing geographic coordinate data and travel time information between identified locations; and
   an agent generating a second calendar entry input by a user and identifying a second location, the agent identifying one of the first and second calendar entries as a next appointment entry and calculating an estimated travel time for the next appointment entry in response to the determined current location, the location of the next appointment entry, and the corresponding stored travel time information.

2. The system of claim 1, wherein the agent calculates a second estimated travel time between the first and second locations in accordance with the respective geographic coordinate data and travel time information of the first and second locations.

3. The system of claim 1, further comprising a second wireless receiver interface receiving traffic data, the agent calculating a revised travel time for the next appointment entry in response to the determined current location, the received traffic data, and the stored travel time information corresponding to the next appointment entry.

4. The system of claim 3, further comprising a traffic database collecting the received traffic data, the agent calculating the estimated travel time in accordance with the collected traffic data.

5. The system of claim 3, wherein the mapping database stores a plurality of travel routes from the determined current location to the location of the next appointment entry, the agent identifying one of the travel routes as corresponding to the revised travel time.

6. The system of claim 5, wherein the agent calculates a second estimated travel time for the next appointment entry corresponding to another one of the travel routes in response to a conflict detected between the revised travel time and the time of the next appointment entry.

7. The system of claim 1, further comprising a location register storing the determined current location.

8. The system of claim 7, further comprising a display outputting a graphic illustration of the determined current location and the location identified by a selected one of the calendar entries.

9. The system of claim 1, wherein the agent outputs the second calendar entry via the first transceiver interface for updating the transmitting calendar system.

10. The system of claim 1, wherein the wireless transceiver interface sends and receives calendar entries to and from the transmitting calendar system via a wireless paging system.

11. A method of managing a personal calendar in a portable device, comprising:
    receiving from a remote calendar system a first calendar entry having a first time entry and identifying a first location;
    determining a current location from wireless location data received from a wireless location detection system;
    receiving wireless traffic data; and
    calculating an estimated travel time, based on the received wireless traffic data, between one of (1) the determined current location and the first location, and (2) the first location and a second location of a second calendar entry stored in the personal calendar and having a second time entry.

12. The method of claim 11, further comprising:
    receiving user inputs of a third calendar entry having a third time entry after the first time entry and identifying a third location; and
    calculating a second estimated travel time between the first location and the third location based on the received wireless traffic data and stored travel time data.

13. The method of claim 12, further comprising:
    sending the third calendar entry and the second estimated travel time to the remote calendar system;
    receiving a conflict message from the remote calendar system identifying a scheduling conflict between the third calendar entry and a fourth calendar entry generated at the remote calendar system;
    selecting one of the third and fourth calendar entries;
    storing the selected entry in the personal calendar; and
    sending the selected entry to the remote calendar system.

14. The method of claim 11, further comprising:
    storing a digitized map having coordinate data including the determined current location and the first and second locations; and
    identifying a first travel route corresponding to the estimated travel time.

15. The method of claim 14, further comprising:
    receiving updated wireless traffic data;
    calculating an updated estimated travel time based on the received updated wireless traffic data and the determined current location; and
    alerting the user if the updated estimated travel time conflicts with the first time entry.

16. The method of claim 15, wherein the alerting step comprises:
    identifying a second travel route having an alternate path between endpoints of the first route;

calculating an alternate estimated travel time corresponding to the second travel route based on the determined current location and the received updated wireless traffic data; and displaying the second travel route if the alternate estimated travel time is less than the updated estimated travel time.

17. The method of claim 15, wherein the alerting step comprises:

prompting the user to change the first time entry;

changing the first time entry in response to a user input; and wireless transmitting the changed first time entry to the remote calendar system.

18. The method of claim 11, further comprising:

changing the first time entry in response to a user input; and wireless transmitting the changed first time entry to the remote calendar system.

19. The method of claim 11, further comprising:

storing a schedule change request having a third time entry and identifying a third location in response to a user input;

calculating a second estimated travel time, based on the received wireless traffic data, between one of (1) the determined current location and the third location, and (2) the second and third locations;

determining if a conflict is detected between the calculated second estimated travel time and the third time entry; and alerting the user if the conflict is detected.

20. The method of claim 19, further comprising sending the schedule change request by wireless transmission to the remote calendar system if no conflict is detected.

21. The method of claim 11, wherein the first calendar entry receiving step comprises receiving a wireless paging signal carrying the first calendar entry.

22. A personal calendar system comprising:

an office calendar system comprising:

(a) a first interface receiving primary user calendar information from a transceiver, (b) a second interface receiving secondary user calendar information, and (c) a first agent generating the office calendar in response to the primary user calendar information and the secondary user calendar information and outputting office calendar information representing selected portions of the office calendar to the first interface; and a portable calendar system comprising:

(a) a first wireless transceiver interface receiving the office calendar information, (b) a second wireless receiver interface receiving location data, and (c) a second agent generating a personal calendar in the portable calendar system in response to the received office calendar information and the location data, the second agent outputting the secondary user calendar information including changes in the personal calendar relative to the received office calendar information.

23. The system of claim 22, wherein the portable calendar system further comprises a third wireless receiver interface receiving traffic data, the second agent calculating an estimated travel time in accordance with the received location data, the personal calendar data, and the received traffic data.

24. The system of claim 23, wherein the personal calendar data includes location data, the second agent calculating the estimated travel time in response to the location data and the reception of the traffic data.

25. The system of claim 23, wherein the second agent generates an updated estimated travel time in response to reception of updated traffic data.

26. The system of claim 25, wherein the second agent determines an alternate travel route if the updated estimated travel time creates a conflict with the stored personal calendar data.

27. The system of claim 25, wherein the second agent updates the personal calendar with the updated estimated travel time and alerts the user of the updated travel time.

28. A method of implementing a personal calendar in a portable device, comprising:

providing an element for performing the step of receiving a first calendar entry from a remote calendar system, the first calendar entry having a first time entry and identifying a first location;

providing an element for performing the step of determining a current location from wireless location data received by the portable device;

providing an element for performing the step of receiving wireless traffic data; and providing an element for performing the step of calculating an estimated travel time, based on the received wireless traffic data, between one of (1) the determined current location and the first location, and (2) the first location and a second location of a second calendar entry stored in the personal calendar and having a second time entry.

29. The method of claim 28, further comprising:

providing an element for performing the step of storing a digitized map having coordinate data including the determined current location and the first and second locations; and providing an element for performing the step of identifying a first travel route corresponding to the estimated travel time.

30. The method of claim 28, further comprising:

providing an element for performing the step of changing the first time entry in response to a user input; and providing an element for performing the step of wireless transmitting the changed first time entry to the remote calendar system.

31. A computer program product for implementing a portable calendar system, comprising:

a computer readable memory medium; and a computer program including:

(1) a routine for receiving a first calendar entry from a transmitting calendar system, the first calendar entry identifying a first location, (2) a routine for receiving location data and determining a current physical location, (3) a routine providing geographic coordinate data and travel time information between identified locations, and (4) a routine accepting a second calendar entry identifying a second location and identifying one of the first and second calendar entries as a next appointment entry and calculating an estimated travel time for the next appointment entry in response to the determined current physical location, the location of the next appointment entry, and the corresponding stored travel time information.

* * * * *